(12) United States Patent
Motoyama et al.

(10) Patent No.: US 7,376,728 B1
(45) Date of Patent: *May 20, 2008

(54) METHOD AND SYSTEM FOR MONITORING, COLLECTING INFORMATION, DIAGNOSING AND SERVICING A REMOTE SYSTEM

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 1074 days.

This patent is subject to a terminal disclaimer.

(21) Appl. No.: 09/575,710

(22) Filed: Jul. 25, 2000

(51) Int. Cl.
*G06F 15/16* (2006.01)
*G06F 15/173* (2006.01)

(52) U.S. Cl. .................. 709/224; 709/203; 709/217; 709/244; 709/246

(58) Field of Classification Search ............. 709/224, 709/223, 318, 217, 203, 244, 246; 714/48, 714/57, 25–27; 702/188; 340/825.16, 506, 340/517; 379/9.03–9.04; 705/59
See application file for complete search history.

(56) References Cited

U.S. PATENT DOCUMENTS

| | | | | |
|---|---|---|---|---|
| 4,551,718 A | * | 11/1985 | Cookson et al. ............. 340/517 |
| 5,568,618 A | * | 10/1996 | Motoyama ................... 710/100 |
| 5,835,911 A | * | 11/1998 | Nakagawa et al. ......... 707/203 |
| 5,864,783 A | * | 1/1999 | Struck et al. ............... 702/184 |
| 5,870,667 A | * | 2/1999 | Globuschutz ............... 455/419 |
| 5,887,216 A | * | 3/1999 | Motoyama .................... 399/8 |
| 5,963,911 A | * | 10/1999 | Walker et al. ................. 705/7 |
| 6,067,486 A | * | 5/2000 | Aragones et al. ............ 701/29 |
| 6,167,053 A | * | 12/2000 | Sato ........................... 370/410 |
| 6,167,358 A | * | 12/2000 | Othmer et al. ............. 702/188 |
| 6,308,120 B1 | * | 10/2001 | Good ............................ 701/29 |
| 6,317,848 B1 | | 11/2001 | Sorens et al. |
| 6,363,422 B1 | * | 3/2002 | Hunter et al. .............. 709/224 |
| 6,408,232 B1 | * | 6/2002 | Cannon et al. .............. 701/29 |
| 6,477,667 B1 | * | 11/2002 | Levi et al. .................... 714/57 |
| 6,516,427 B1 | * | 2/2003 | Keyes et al. ................. 714/25 |
| 6,584,454 B1 | * | 6/2003 | Hummel et al. ............. 705/59 |
| 6,609,217 B1 | * | 8/2003 | Bonissone et al. .......... 714/26 |
| 6,665,425 B1 | * | 12/2003 | Sampath et al. ........... 382/112 |
| 6,689,055 B1 | * | 2/2004 | Mullen et al. .............. 600/300 |
| 7,053,767 B2 | | 5/2006 | Petite et al. |

FOREIGN PATENT DOCUMENTS

JP  2001257676 A * 9/2001

OTHER PUBLICATIONS

Woodbury, Marsha; LEEP3—Distance Education Tips; 1997; ACM.*
U.S. Appl. No. 09/575,710, filed Jul. 25, 2000, Motoyama et al.

(Continued)

*Primary Examiner*—Quang N. Nguyen
(74) *Attorney, Agent, or Firm*—Oblon, Spivak, McClelland, Maier & Neustadt, P.C.

(57) ABSTRACT

A monitoring system, method, and computer-program product tracks events and device states in a device and sends those events and states to a remote central service center using an Internet access module. The remote central service center monitors the received events and states for errors or warnings. The monitoring software (e.g., a dynamic link library) supports multiple data formats and multiple protocols to more effectively communicate the event and state information.

33 Claims, 14 Drawing Sheets

OTHER PUBLICATIONS

U.S. Appl. No. 11/311,248, filed Dec. 20, 2005, Motoyama.
U.S. Appl. No. 11/341,434, filed Jan. 30, 2006, Motoyama et al.
U.S. Appl. No. 09/782,164, filed Feb. 14, 2001, pending.
U.S. Appl. No. 09/782,083, filed Feb. 14, 2001, pending.
U.S. Appl. No. 09/782,064, filed Feb. 14, 2001, pending.
U.S. Appl. No. 09/782,187, filed Feb. 14, 2001, pending.
U.S. Appl. No. 09/756,120, filed Jan. 9, 2001, pending.
U.S. Appl. No. 10/831,187, filed Apr. 26, 2004, Motoyama et al.
U.S. Appl. No. 11/873,935, filed Oct. 17, 2007, Motoyama et al.
U.S. Appl. No. 11/935,161, filed Nov. 5, 2007, Motoyama et al.
U.S. Appl. No. 11/861,889, filed Sep. 26, 2007, Motoyama.
U.S. Appl. No. 11/861,875, filed Sep. 26, 2007, Motoyama.

* cited by examiner

| Return Value | Function Name | Description |
|---|---|---|
| bool | getNextSession | Returns false when there is no more session; true otherwise |
| string | getFileName | Returns file name for the EventData |
| map<string, string> | getSessionInformation | Returns the map. Keys are UserID, ApplicationID, CumulativeSessionNumber, StartTime, and Duration. |
| map<string, vector<string>> | getSessionEventData | Returns the map. Keys are EventName and EventTiming. The values of EventTiming vector are in the unit of 10th of a second converted from unsigned integer to string. |

Figure 6B

| Return Value | Function Name | Description |
|---|---|---|
| bool | getNextLine | Returns one line of string data as an out parameter string. The function returns true if there is a line; false if no more line exists with empty string. |
| string | getFileNameWithSuffix | Returns file name for the data with suffix if applicable |

Figure 6C

METHOD AND SYSTEM FOR MONITORING, COLLECTING INFORMATION, DIAGNOSING AND SERVICING A REMOTE SYSTEM

CROSS REFERENCE TO RELATED APPLICATIONS

Continuity Statement

The present application, is related to the following U.S. applications and patents: Ser. No. 09/575,702 filed Jul. 12, 2000; Ser. No. 09/453,934 filed May 17, 2000; Ser. No. 09/453,935 filed May 17, 2000; Ser. No. 09/453,936 filed May 17, 2000; Ser. No. 09/453,937 filed May 17, 2000; Ser. No. 09/542,284 filed Apr. 4, 2000; Ser. No. 09/520,368 filed Mar. 7, 2000; Ser. No. 09/440,692 filed Nov. 16, 1999; Ser. No. 09/440,647 filed Nov. 16, 1999; Ser. No. 09/440,646 filed Nov. 16, 1999; Ser. No. 09/440,693 filed Nov. 16, 1999; Ser. No. 09/440,645 filed Nov. 16, 1999; Ser. No. 09/408,443 filed Sep. 29, 1999; Ser. No. 09/407,769 filed Sep. 29, 1999; Ser. No. 09/393,677 filed Sep. 10, 1999; Ser. No. 09/311,148 filed May 13, 1999; Ser. No. 09/192,583 filed Nov. 17, 1998; Ser. No. 09/190,460 filed Nov. 13, 1998; Ser. No. 08/883,492 filed Jun. 26, 1997; Ser. No. 09/108,705 filed Jul. 1, 1998; Ser. No. 09/107,989 filed Jul. 1, 1998; Ser. No. 08/997,482 filed Dec. 23, 1997; Ser. No. 08/997,705 filed Dec. 23, 1997; Ser. No. 08/738,659 filed Oct. 30, 1996; Ser. No. 08/738,461 filed Oct. 30, 1996; Ser. No. 09/457,669 filed Dec. 9, 1999; Ser. No. 08/916,009 filed Aug. 21, 1997; Ser. No. 07/902,462 filed Jun. 19, 1992; Ser. No. 07/549,278 filed Jul. 6, 1990; U.S. Pat. No. 5,908,493; U.S. Pat. No. 5,887,216; U.S. Pat. No. 5,818,603; U.S. Pat. No. 5,819,110; U.S. Pat. No. 5,774,678; U.S. Pat. No. 5,649,120; U.S. Pat. No. 5,568,618; U.S. Pat. No. 5,544,289; U.S. Pat. No. 5,57,554; and U.S. Pat. No. 5,412,779. The contents of each of those applications and patents is incorporated herein by reference.

BACKGROUND OF INVENTION

The present invention generally relates to a method and system that can monitor state and event information of a remote device and communicate the information over the Internet to a central information system. The central information system can analyze the state and event information to determine the condition of the remote device and/or whether the remote device needs preventative or reparative maintenance.

Maintenance and repairs for devices are expensive. Often the cost of preventative maintenance is less than that required for repairs or replacement of parts of a device. By identifying potential problems, repairs and their associated costs can be avoided. Some devices have sensors to determine their own states, some of which are locally communicated to the device user through a display (e.g., a low toner display of a copier). Such displays will indicate to the owner when action should be taken locally to correct any potential problems with the device.

Motor vehicle owners spend time and money to keep their motor vehicle in good condition. Worn out parts or low fluid levels if not repaired or replace quickly can damage other parts of the motor vehicle. Accidents or expensive repairs may result if repairs or replacement are not performed immediately (e.g., rotors need replacement if brake shoes are not replaced for a car). Motor vehicles have sensors to determine the state of the motor vehicle, some of which locally communicate their state to the owner through the gauges (e.g., temperature of radiator, voltage of the battery, oil pressure, and gas level in a car). Those gauges will locally indicate to the owner when action should be taken to correct any potential problems with the motor vehicle.

Internet communication is becoming increasingly popular. Examples of Internet communication include RFC 2298—An Extensible Message Format for Message Disposition Notifications and "Web on Wheels: Toward Internet Enabled Cars" by A. Jameel, M. Stuempfle, D. Jiang, and A. Fuchs, 1998 IEEE Vol. 31, No. 1: January 1998, pp. 69-76. The contents of both of those articles are incorporated herein by reference.

SUMMARY OF INVENTION

Not all conditions of a device (e.g., digital imaging device) can be displayed or corrected locally by the owner of the device. By monitoring the state of various parts of the device and communicating this information to a remotely located central information system, the condition of the device may be reported to the device dealer or service center who can take action to correct the problems that may exist. Thus, it is an object of the present invention to use a Wide Area Network (e.g., the Internet) to remotely monitor the states of remotely located devices. Examples of states are the measures of the amount of resources available or the environmental conditions. It may be helpful to know the states of a device so as to recognize possible conditions that can impair the performance of the device.

It is an independent object of the invention to monitor the events and states of a unit such as a car, motorcycle, recreation vehicle (RV), motorized boat, train, or airplane. The events are the interaction between the user and the unit. As an example, it may be desirable to monitor the user's use of the various electronic components of the unit (e.g., the power windows, cruise control, air conditioning, or power seats). Event information is helpful to the motor vehicle manufacturer to determine which features of a motor vehicle are desirable among its users.

The states are measures of the conditions (e.g., the fuel level, the oil pressure, or the temperature level of the radiator) of the unit. State information is helpful to the unit manufacturer to perform diagnostics to determine if service or maintenance is needed for the unit (e.g., motor vehicle). Further it may be desirable to monitor the state changes within the unit. Some state changes in a motor vehicle or other unit may be signs of potential problems. For example, the rapid rise in temperature of the radiator of a car possibly indicates that the radiator is overheating. By monitoring the state of various parts of the motor vehicle and communicating this information to a central information system, the condition of the motor vehicle may be reported to the motor vehicle dealer or service center who can take action to correct the problems that may exist.

A further object of the present invention is to provide a system for communicating data obtained by monitoring the device to a central information system allowing various data formats that ease the analysis of received data at the receiving side.

A further object of the present invention is to communicate the monitored event and state information periodically or when potential breakdown conditions occur in the device.

A further object of the present invention is to efficiently communicate the monitored information to a transmission unit.

A further object of the present invention is for the central information system to maintain a history of the data and to analyze the data and, if necessary, communicate the information to a device dealer or service center that can contact the device having the potential problem. The device dealer or service center can provide the services to repair the devices.

The present invention achieves these and other objects by monitoring the states and events of the device. The data obtained by monitoring the states and events of a device, as a further feature in the present invention, is collected, logged, and communicated to a central information system (e.g., using Internet e-mail or the File Transfer Protocol (FTP)). The use of e-mail communication reduces the costs associated with communicating such data. The data can be communicated to the central information system at several instances. Such instances include each time a user turns off the device, or after a predetermined number of times that a user has utilized and turned off the device, or after a predetermined time period, or when potential breakdown conditions exist in the device. If the configuration allows and if necessary, the direct connection such as FTP between the monitored application and the monitoring system can be established in addition to the e-mail communication.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 6B is an exemplary EventData class interface for use in the architecture of FIG. 6A;

FIG. 6C is an exemplary FormattedEventData class interface for use in the architecture of FIG. 6A;

DETAILED DESCRIPTION

Figure 1:
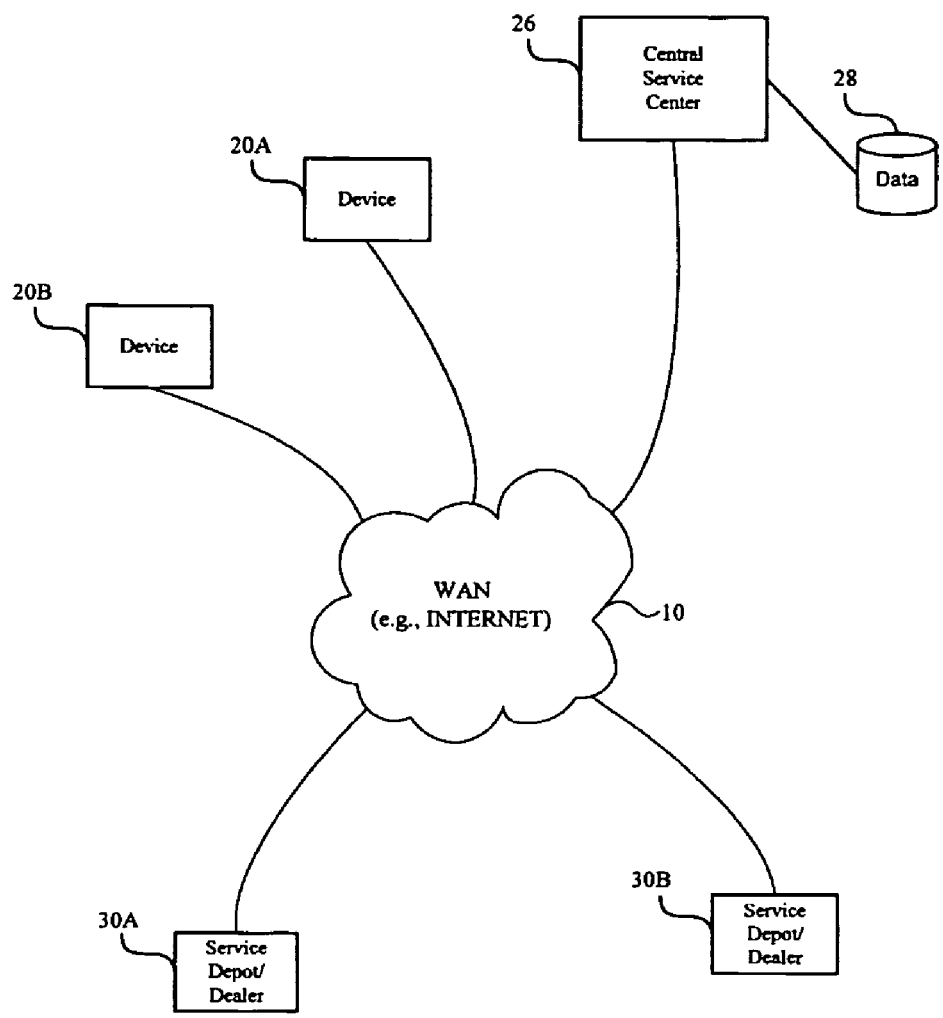
FIG. 1 illustrates the use of a central service center to monitor the conditions of remotely located devices such that a service center/depot can perform preventative maintenance on the devices.

Referring now to the drawings, wherein like reference numerals designate identical or corresponding parts throughout the several views. FIG. 1 illustrates Device 20A and Device 20B whose states and events are being monitored. The devices can refer to business office machines such as copiers, facsimile machines, facsimile servers, scanners, a thin server or printers. The devices can also refer to appliances such as microwave ovens, VCRs, digital cameras, cellular phones, or palm top computers. Further, the devices can refer to metering systems (e.g., gas, water, or electricity metering systems), vending machines, or any other mechanical devices including mobile units such as automobiles, motor cycles, boats, trains and airplanes. In addition to devices referring to special purpose machines, the devices can refer to general-purpose computers.

Referring to FIG. 1, the events of Device 20A are monitored as the events occur (e.g., when the user interacts with the operation panel of a copier). The states (e.g., the toner level of the copier) of Device 20A are also monitored. The states of Device 20A can be monitored periodically (e.g., every 5 minutes or 10 minutes) or aperiodically. Also, the states of Device 20A can be monitored as the condition of Device 20A changes (e.g., when the toner level lowers). In an embodiment using a DLL, the monitoring DLL will collect and record the event and state information of Device 20A. Then this information is communicated to a Central Service Center 26 via email or ftp through a wide area network (WAN) (e.g., the Internet or its successor), generally designated by 10. The WAN 10 can either be a private WAN or a public WAN. The Central Service Center 26 can be geographically located where the communication costs would be low. As is described in more detail below, the events and states of Device 20B are monitored (collected and recorded) and communicated in a similar manner as Device 20A.

Further in FIG. 1, the Central Service Center 26 has connected thereto Data 28 that may be stored in a database format. The Data 28 includes a history of the state and event information of Device 20A that is being monitored. The Central Service Center 26 can analyze how Device 20A is being used and its condition. From the analysis of the Data 28, the Central Service Center 26 can identify some conditions in Device 20A that may require some service to be performed on it. Thus, the Central Service Center 26 may communicate a service request to a Service Depot/Dealer 30A or 30B through the Internet 10. The Service Depot/Dealer 30A or 30B (30A/B) can properly respond to the service request for Device 20A. The Service Depot/Dealer 30A/B can obtain the service history of Device 20A from the Central Service Center 26 through the Internet 10. The Service Depot/Dealer 30A/B may contain an interface unit that allows it to interface with the information provided by the Central Service Center 26. For example, the interface unit allows the information from the Central Service Center 26 that is in one language to be converted into to another language to be read at the Service Depot/Dealer 30A/B. After the Service Depot/Dealer 30A/B analyzes the service history and service request, it communicates the service request to Device 20A through the Internet 10. The user of Device 20A can then respond appropriately to the service request. Alternatively, the Service Depot/Dealer 30A/B may contact the owner of Device 20A via e-mail or through the phone. If necessary, the Service Depot/Dealer 30A/B may obtain information from Device 20A through the Internet 10.

In a similar manner in FIG. 1, the event and state information of Device 20B is communicated to the Central Service Center 26 through the Internet 10. The Data 28 includes a history of the state and event information of Device 20B. As it did for Device 20A, the Central Service Center 26 can identify some conditions in Device 20B that may require some service to be performed on it. The Central Service Center 26 can communicate a service request to the Service Depot/Dealer 30A/B through the Internet 10. The Service Depot/Dealer 30A/B can obtain the service history of Device 20B from the Central Service Center 26 through the Internet 10. After the Service Depot/Dealer 30A/B analyzes the service history and service request, it communicates the service request to Device 20B through the Internet 10. The user of Device 20B can then respond appropriately to the service request.

Figure 2A:
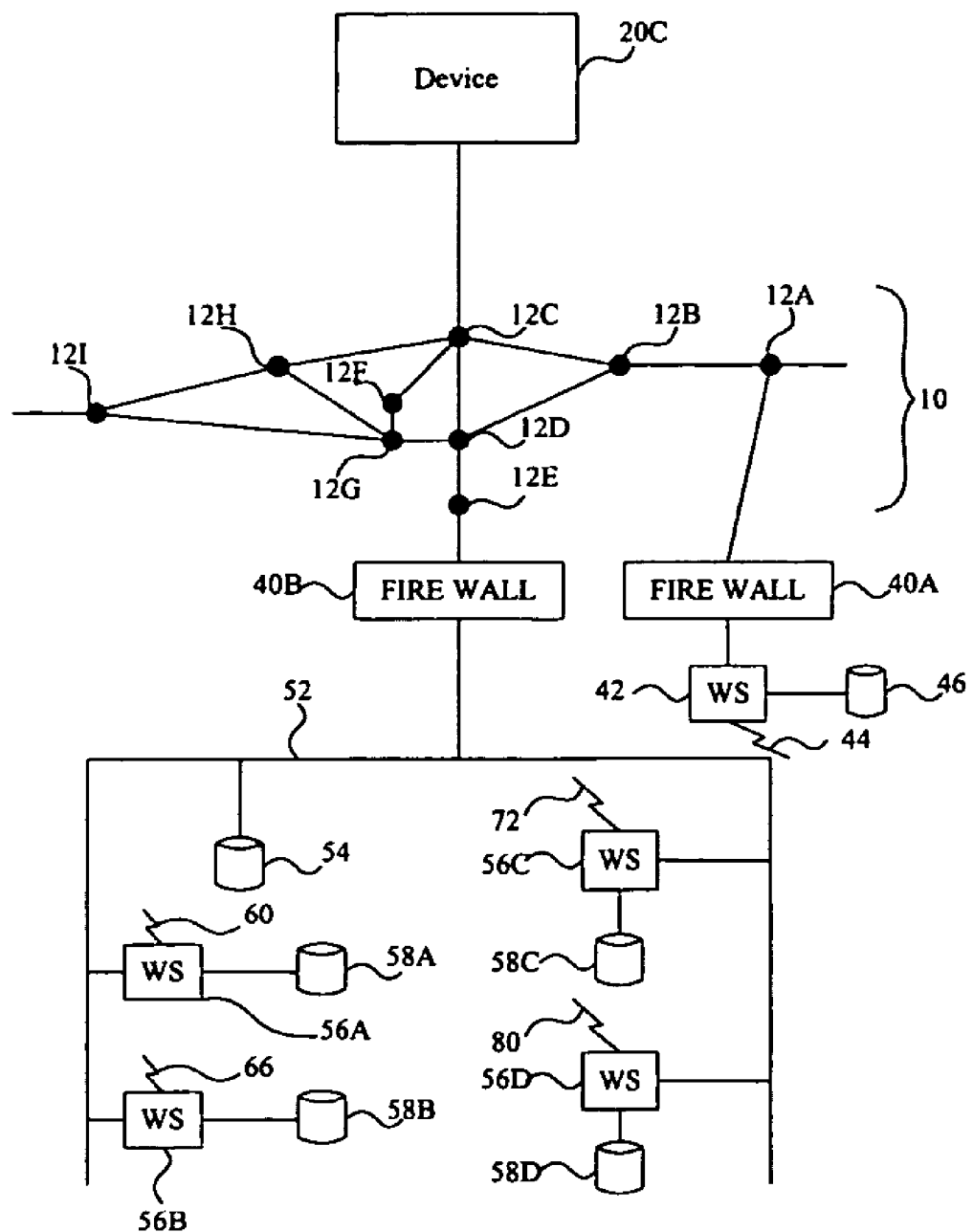
FIGS. 2A-2C illustrate first through third exemplary embodiments of a device connected to a network of computers and databases through a Wide Area Network (e.g., the Internet)

FIG. 2A illustrates a device 20C (generally "20") according to the present invention that is connected to a Wide Area Network (WAN) 10 via a wireless connection (e.g., using a radio frequency (RF) or infra-red (IR) transmitter or transceiver). The device 20 obtains events and state information from internal sensors that describe the interactions with the user and how the device is changing or behaving. That state and event information is communicated to a recipient. Wireless transceivers are commercially available from Ricochet Wireless, Sprint PCS Wireless, and RCN's Blackberry Wireless Email.

In a first embodiment of a device connected to a network of computers and databases through the WAN 10, the WAN 10 includes a plurality of interconnected computers and routers designated by 12A-12I. The manner of communicating over a WAN is known through RFC documents available at HTTP://www.ietf.org/rfc.html. Transmission Control Protocol/Internet Protocol (TCP/IP) related communication is described in several references, including (1) TCP/IP Illustrated, Vol. 1, The Protocols, by Stevens, from Addison-Wesley Publishing Company, 1994, ISBN: 0201633469, (2) Internetworking with TCP/IP by Corner and Stevens, 4th edition, Vol. 1 (Apr. 15, 2000), Prentice Hall; ISBN: 0130183806, (3) Internetworking with TCP/IP, Vol. II, ANSI C Version: Design, Implementation, and Internals, by Corner and Stevens, 3 edition (Jun. 10, 1998) Prentice Hall; ISBN: 0139738436, and (4) Internetworking with TCP/IP, Vol. III, Client-Server Programming and Applications-Windows Sockets Version, by Corner and Stevens, 1 edition (Apr. 28, 1997) Prentice Hall; ISBN: 0138487146. The contents of all four books are incorporated herein by reference in their entirety.

In FIG. 2A, a firewall 40B is connected between the WAN 10 and a network 52. Also, a firewall 40A is connected between the WAN 10 and a workstation 42. Firewalls (generally "40") are devices that allow only authorized computers on one side of the firewall to access a network or other computers on the other side of the firewall. Firewalls such as firewall 40A and 40B are known and commercially available devices and/or software (e.g., SunScreen from Sun Microsystems Inc.).

The network 52 is a conventional network and includes a plurality of workstations 56A-56D. Such workstations may either be in a single department or multiple departments. In addition to the workstations connected via the network 52, there is a workstation 42 that is not directly connected to the network 52. Information in a database stored in a disk 46 may be shared using proper encryption and protocols over the WAN 10 to the workstations connected directly to the network 52. Also, the workstation 42 includes a direct connection to a telephone line and/or Integrated Services Digital Network (ISDN) and/or cable and/or wireless network 44, and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable. The workstations 42 and 56A-56D that are connected to the WAN provide a secure connection to the device 20. This allows the device 20 to properly communicate state and event information to any of the workstations 42 and 56A-56D. Devices 58A-58D are data storage devices.

The network 52 can be part of the Central Service Center 26 of FIG. 1 that maintains a history of state and event information of Devices 20A and 20B. Alternatively, the workstation 42 and disk 46 can be part of the Central Service Center 26 of FIG. 1. It is also possible that the network 52 or the workstation 42 and disk 46 can be a Service Depot/Dealer 30A/B of FIG. 1.

Event and state information of Device 20C may be stored in one or more of the databases stored in the disks 46, 54, and 58A-58D. Known databases include (1) SQL databases by Microsoft, Oracle and Sybase, (2) other relational databases, and (3) non-relational databases (including object oriented databases). Each of the different departments (e.g. marketing, manufacturing, design engineering and customer service departments) within a single company may have their own database or may share one or more databases. As an example, disk 58A contains the marketing database, disk 58B contains the manufacturing database, disk 58C contains the design engineering database, and disk 58D contains the customer service database. Alternatively, the disks 54 and 46 store one or more of the databases. Each of the disks used to store databases is a non-volatile memory such as a hard disk or optical disk. Alternatively, the databases may be stored in any storage device including solid state and/or semiconductor memory devices.

A feature of the present invention is the use of a "store-and-forward" mode of communication (e.g., Internet e-mail) or transmission between the device 20 and a workstation for monitoring the state and event information. The "store-and-forward" process avoids the device 20 from having to wait until a direct connection is established with the recipient. Because of network delays, the communication could take a substantial amount of time during which the application would be unresponsive. Such unresponsiveness can be unacceptable to the recipient. By using e-mail as the store-and-forward process, retransmission attempts after failures occur automatically for a fixed period of time. Alternatively, the message that is transmitted may be implemented using a mode of communication that makes direct, end-to-end connections.

Figure 2B:
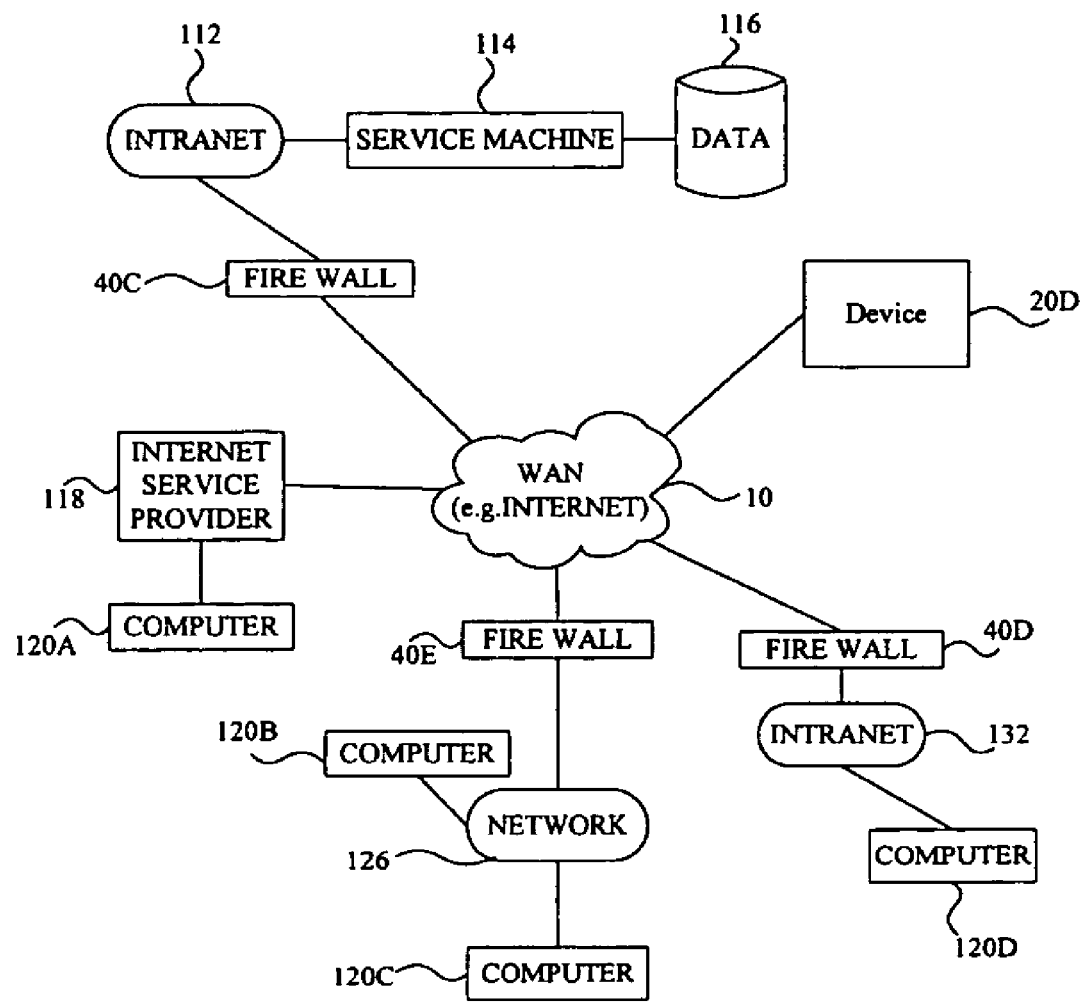
Figure 2C:
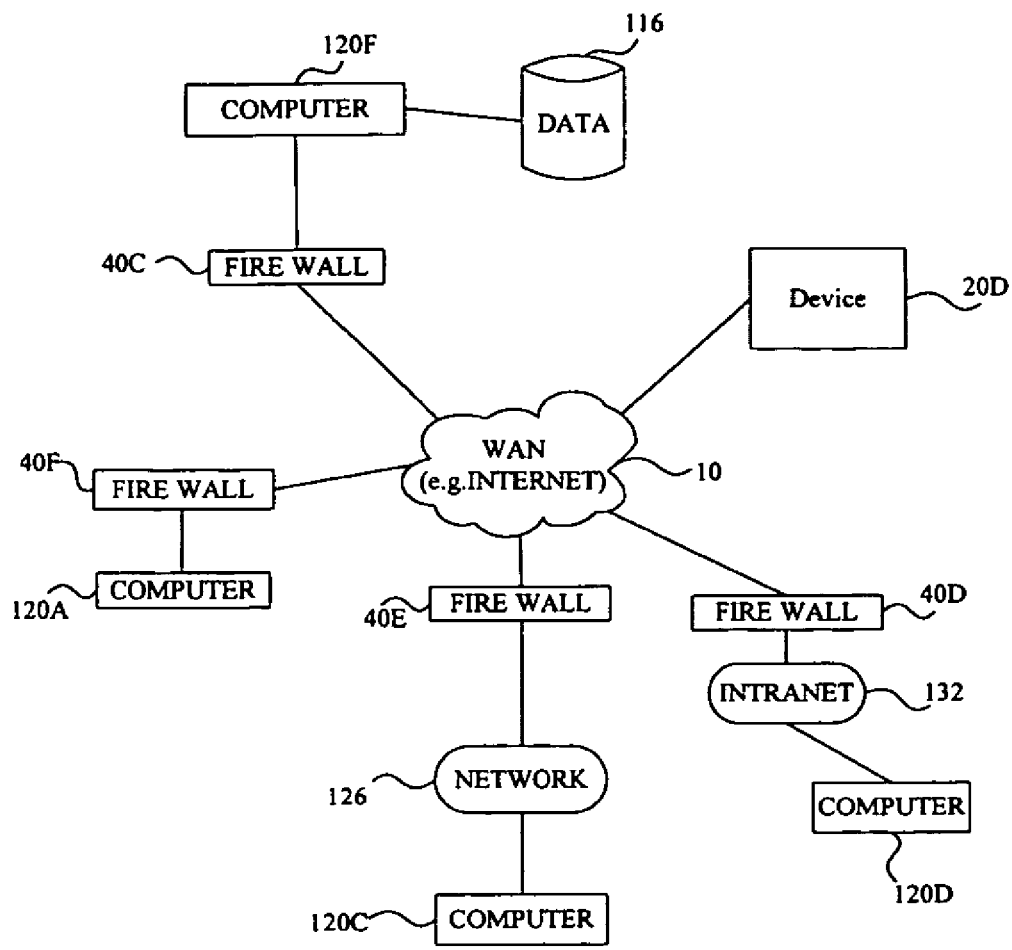

FIGS. 2B and 2C illustrate alternative systems according to the present invention in which different devices and subsystems are connected to the WAN 10. However, there is no requirement to have each of these devices or subsystems as part of the invention. Each component or subsystem illustrated in FIGS. 2A-2C is individually a part of the invention. Further, the elements illustrated in FIG. 2A may be connected to the WAN 10 that are illustrated in FIGS. 2B and 2C. In FIG. 2B, there is a device 20D that is connected to the WAN 10 via a wireless connection. Further in FIG. 2B, there is illustrated a firewall 40C connected to an Intranet 112. The service machine 114 connected to the Intranet 112 includes therein or has connected thereto data 116 which may be stored in a database format. The data 116 may include a history of the state and event information of the device 20D that is being monitored. The service machine 114 may be implemented as any type of device and is preferably implemented using a computerized device such as a general-purpose computer.

An alternate type of sub-system includes the use of an Internet Service Provider (ISP) 118 that may be any type of ISP, including known commercial companies such as for example America Online, Mindspring, and Niftyserve. In this sub-system, a computer 120A is connected to the ISP 118 through a modem (e.g., an analog telephone line modem, a cable modem, an ISDN-based modem, an Asymmetric Digital Subscriber Line (ASDL)-based modem, a frame relay adapter, a wireless (e.g., radio frequency) modem, an optical modem, or a device that uses infrared light waves). The computer 120A may receive state and event information communicated to it by a device 20D.

Also illustrated in FIG. 2B is a firewall 40E connected to a network 126. The network 126 may be implemented as any type of computer network (e.g., an Ethernet or Token-Ring network). Networking software that may be used to control the network includes any desired networking software, including software commercially available from Novell or Microsoft. The network 126 may be implemented as an Intranet, if desired. Computers 120B and 120C connected to the network 126 may receive event, state and even position information from the device 20D. The wireless communication described herein may be established using spread spectrum techniques including techniques which use a spreading code and frequency hopping techniques such as the frequency hopping technique disclosed in the BLUE-TOOTH wireless technology specification (available at the world wide web site www.bluetooth.com), which is incorporated herein by reference.

Another sub-system illustrated in FIG. 2B includes a firewall 40D, an Intranet 132, and a computer 120D. The computer 120D may receive state and event information from the device 20D.

The third exemplary embodiment illustrated in FIG. 2C contains many of the same elements as in FIG. 2B. Repeated elements are not further explained herein, instead only the additions are discussed. Computer 120A connected to the WAN 10 through the firewall 40F. The computer 120A is part of the service depot/dealer that receives information about repairs or maintenance needed for Device 20D from the Central Service Center. The computer 120A communicates with the computer 120F of the Central Service Center through the WAN 10. The computer 120A obtains service history information about Device 20D. The computer 120A analyzes the service request and the service history of Device 20D and then communicates the service request to Device 20D through the WAN 10. The user of Device 20D then responds appropriately to the service request.

Further in FIG. 2C, a network 126 is connected to the WAN 10 through the firewall 40E, and a computer 120C is connected to the network 126. The firewall 40E, network 126, and computer 120C can belong to another service depot/dealer that performs repairs and maintenance on other devices that is monitored by the Central Service Center. The Central Service Center can communicate service requests to the computer 120C for all devices that this service depot/dealer repairs and maintains. The computer 120C will communicate with the computer 120F of the Central Service Center through the WAN 10 to obtain service history of the devices it is responsible for repairing and maintaining. The computer 120C will analyze the service requests and the service history of devices and then communicate the service requests to the devices through the WAN 10. The users of the devices can then respond appropriately to the service requests.

Further in FIG. 2C, an Intranet 132 is connected to the WAN 10 through the firewall 40D. In a similar manner as the computer 120C, the computer 120D connected to the Intranet 132 can also belong to another service depot/dealer that performs repairs and maintenance on other devices that is monitored by the Central Service Center. The Central Service Center can communicate service requests to the computer 120D for all devices that this service depot/dealer repairs and maintains. The computer 120D will communicate with the computer 120F of the Central Service Center through the WAN 10 to obtain the service history of each of the devices it is responsible for repairing and maintaining. The computer 120D will analyze the service requests and the service history of those devices and then communicate the service requests to the devices through the WAN 10. The users of the devices can then respond appropriately to the service requests.

While FIGS. 2A-2C illustrate a plurality of firewalls, the firewalls are preferable but optional equipment and therefore the invention may be operated without the use of firewalls, if desired.

Figure 3A:
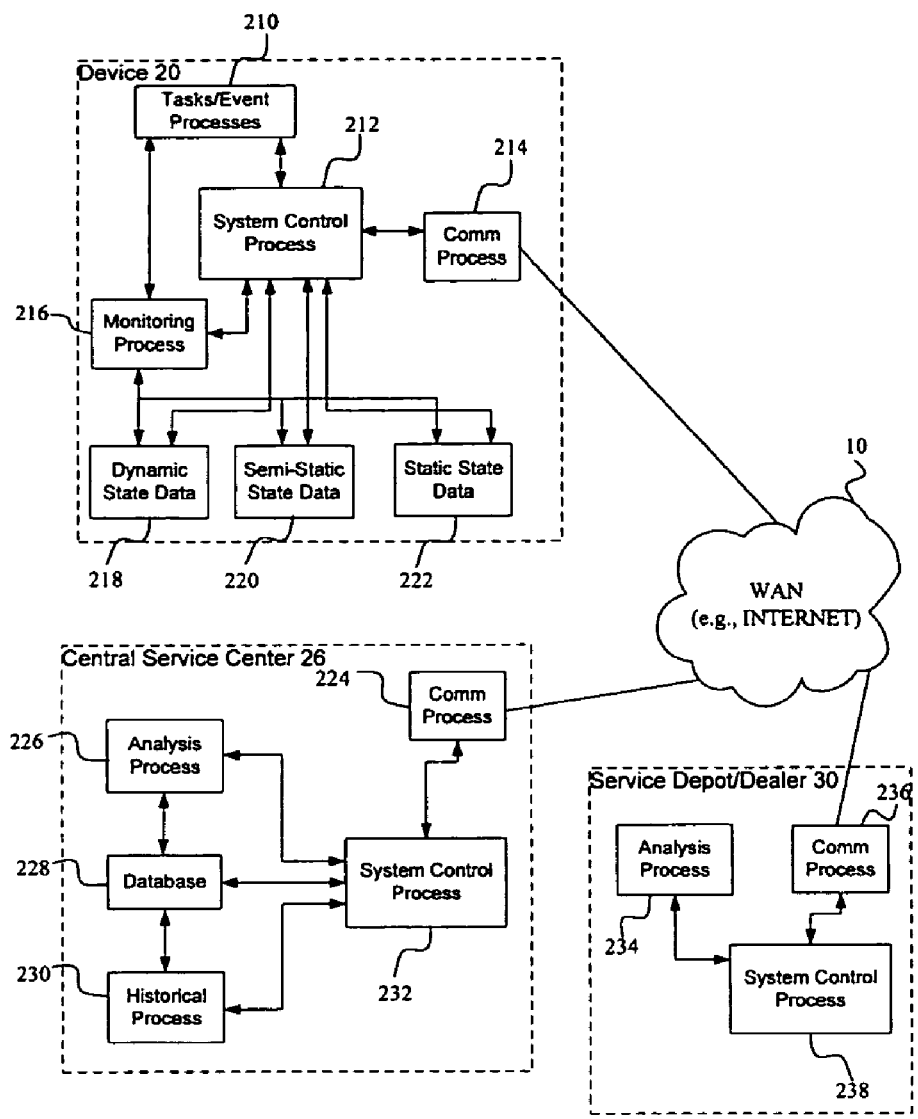
FIGS. 3A and 3B illustrate functional and hardware block diagrams, respectively, according to the present invention.

FIG. 3A illustrates a preferred embodiment of the present invention including a Device 20, a Central Service Center 26, a Service Depot/Dealer 30, and the WAN 10. The Device 20 includes Static State Data 222, which provides a means to store data that does not change over the life of the Device 20, such as the model number, serial number, and model characteristics of a device. Device 20 also includes Semi-Static State Data 220, which provides a means to store data that may change over the life of the Device 20 but infrequently, such as the ROM version and option configuration of the device. In addition, Device 20 includes Dynamic State Data 218, which provides a means to store data that changes according to various states of the Device 20, such as the mechanical state, the electronic state and the software state. Examples are the paper status in the tray, oil, toner, number of prints, sensitivity of the photoreceptor, condition of the paper path, location of a copier; battery status of an automobile; and an unexpected error condition in the fimware. Further, the Dynamic State Data 218 provides a means to store data regarding the events that occur in Device 20 such as when the user interacts with the control panel of a copier; with a CD/Radio control of an automobile; and with seat adjustment of an automobile. In order to store the state and event information in Dynamic State Data 218, Device 20 includes a Monitoring Process 216 to monitor and store the state and events of Device 20. Also, the Monitoring Process 216 is able to obtain state information from the Static State Data 222, Semi-Static State Data 220, and Dynamic State Data 218. The overall system activities of Device 20 are coordinated by System Control Process 212.

Further, as shown in FIG. 3A, Device 20 includes a Communication Process 214 that can be used to communicate the state and event information of Device 20 stored in Dynamic State Data 218, Semi-Static State Data 220, and Static State Data 222. Communication Process 214 communicates this information to the Central Service Center 26 through the Internet 10. The information can be communicated periodically.

At power-on time, System Control Process 212 not only brings up the Device 20, but also establishes communication with attached devices by first checking the physical connections and then establishing communication with the attached devices. Then Device 20 remains idle until a user interacts with Device 20. When the user interacts with Device 20, the System Control Process 212 interprets the function in which the user wants to perform. The System Control Process 212 informs the Tasks/Events Processes 210 to perform the various tasks to complete the function. The Monitoring Process 216 logs the interaction of a user along with the state of Device 20.

Further in FIG. 3A during the idle time, System Control Process 212 continuously monitors the state of Device 20 through Monitoring Process 216. The System Control Process 212 may send data to Communication Process 214 to communicate the event and state information to the Central Service Center 26 through the Internet 10 periodically. Or if abnormal states are detected, System Control Process 212 may send data to Communication Process 214 to communicate the event and state information, including the abnormal state information, to the Central Service Center 26 through the Internet 10.

The Central Service Center 26 in FIG. 3A receives state and event information of Device 20 from the Internet 10 through Communication Process 224. The Central Service Center 26 includes the System Control Process 232 that coordinates the overall system activities of the Central Service Center 26. The System Control Process 232 stores the state and event information in the Database 228. The Central Service Center 26 includes an Analysis Process 226 that analyzes the state and event information in Database 228 for Device 20 as well as for all other devices that the Central Service Center 26 is responsible for monitoring. Also, the Central Service Center 26 includes a Historical Process 230 that analyzes the service history in Database 228 for Device 20 as well as for all other devices.

The Analysis Process 226 informs the System Control Process 232 if the analysis of the Database 228 for Device 20 identifies a potential problem or an abnormal condition. Then the Historical Process 230 provides service information to the System Control Process 232 about which Service Depot/Dealer has provided service and maintenance to Device 20. System Control Process 232 sends data to Communication Process 224 to communicate the maintenance or repair request of Device 20 to the Service Depot/Dealer 30 through the Internet 10.

Further in FIG. 3A the Service Depot/Dealer 30 receives the maintenance or repair request of Device 20 from the Internet 10 through Communication Process 236. The Service Depot/Dealer 30 includes the System Control Process 238 that coordinates the overall system activities of the Service Depot/Dealer 30. The System Control Process 238 requests and obtains state, event, and service information of Device 20 from Central Service Center 26 through the Internet 10 using the Communication Process 236. The Service Depot/Dealer 30 includes an Analysis Process 234 that analyzes the state, event, and service information of Device 20. The Service Depot/Dealer 30 sends data to Communication Process 236 to communicate the maintenance or repair request to Device 20 through the Internet 10. It is also possible that personnel of the Service Depot/Dealer 30 may contact the owner of the Device 20 to inform the owner of necessary maintenance or repair to Device 20.

Although FIG. 3a shows that Service Depot/Dealer 30 communicates to Device 20 through the Internet 10, it is possible that Service Depot/Dealer 30 can communicate directly with Device 20 between Communication Process 236 and Communication Process 214 (not illustrated). Thus, it is possible that Service Depot/Dealer 30 may be in the same location as Device 20.

Figure 3B:
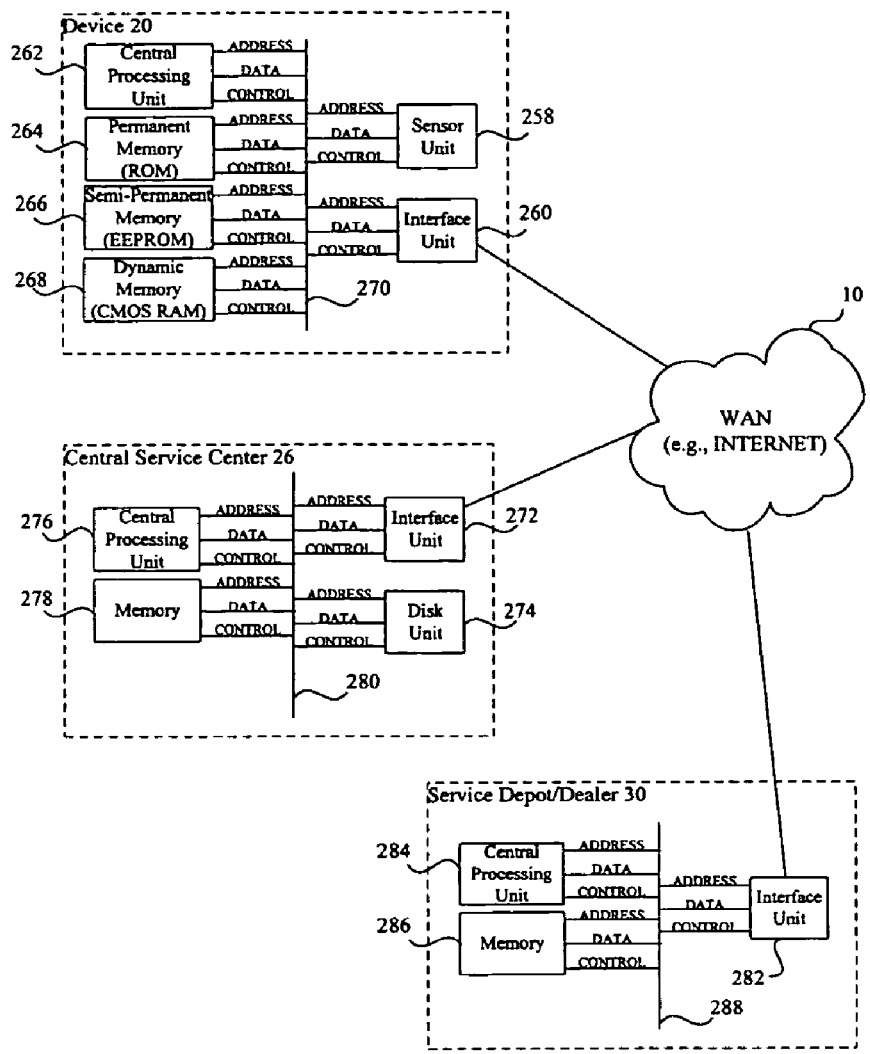

FIG. 3B illustrates hardware features of Device 20, Central Service Center 26, and Service Depot/Dealer 30 of FIG. 3A utilized to implement the present invention. The Device 20, Central Service Center 26, and Service Depot/Dealer 30 all have buses 270, 280, and 288, which connect the Interface Units 260, 272, and 282 respectively and connect the Central Processing Unit (CPU) 262, 276, and 284 respectively. The Interface Units allow Device 20, Central Service Center 26, and Service Depot/Dealer 30 to connect to the Internet 10 so that these components may communicate with one another. Also, it is possible that the Interface Unit 260 of Device 20 may be directly connected (not illustrated) to the Interface Unit 282 of Service Depot/Dealer 30 without the use of the Internet 10. The CPU coordinates the overall system activities of Device 20, Central Service Center 26, and Service Depot/Dealer 30.

Device 20 has a Sensor Unit 258 that senses the mechanical states of Device 20 that must be stored as dynamic data, such as paper tray, voltage and paper path of a copier. Device 20 has Permanent Memory 264 that stores static state data as permanent memory, such as ROM. Device 20 has Semi-Permanent Memory 266 that stores semi-static state data as changeable memory which does not require power such as EEPROM, or which uses low power and can be supported by a battery. Finally, Device 20 has Dynamic Memory 268 that stores dynamic state data as changeable memory, which does not require power or which uses low power and can be supported by a battery such as CMOS RAM.

The Central Service Center 26 has a Disk Unit 274 that holds the database. The database will contain state and event information of Device 20 and other devices monitored by the Central Service Center 26.

Figure 4:
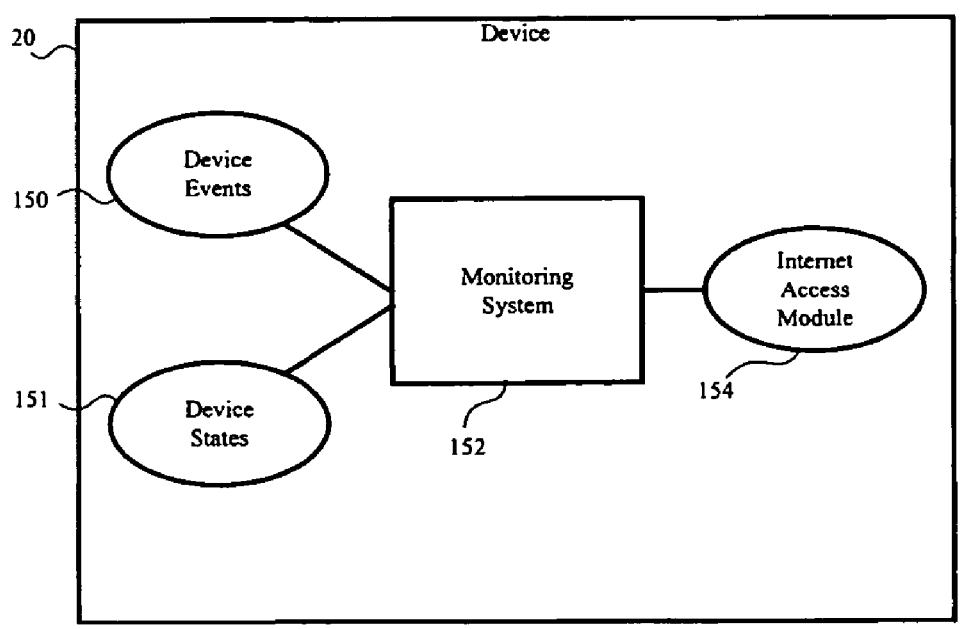
FIG. 4 illustrates components of the device according to one embodiment of the present invention.

FIG. 4 illustrates the components of Device 20 that are involved in the process of monitoring and communicating its state and event information. The Device 20 contains Device Events 150 and Device States 151. Device Events 150 are components of the Device 20 that the user may interact with that results in the events. These events are monitored. An example of an event is a user's interaction with the control panel of a copier. The Device Events 150 generates event information every time the events occur. Device States 151 are components of the Device 20 that measure the state of the Device 20. These states are monitored. An example of a state is the toner level of a copier and a radiator temperature of an automobile. The Device States 151 can generate state information every time the state of the Device 20 changes or can generate state information periodically (e.g., every 5 minutes or 10 minutes), whether or not the state of the Device 20 changes.

Further in FIG. 4, the Device 20 contains a Monitoring System 152. The Monitoring System 152 is a dynamic link library (DLL) that the Device Event 150 and Device States 151 interfaces with to record the state and event information. The Monitoring System 152 monitors and maintains the state and event information of Device 20 and when triggered, the Monitoring System 152 will communicate the state and event information to a Central Service Center.

Further in FIG. 4, the Device 20 contains an Internet Access Module 154. The Internet Access Module 154 interfaces with the Monitoring System 152 so that it may communicate the state and event information to the Central Service Center. The Internet Access Module 154 provides wire-based or wireless access to the Internet so that communication can occur to the Central Service Center.

Figure 5:
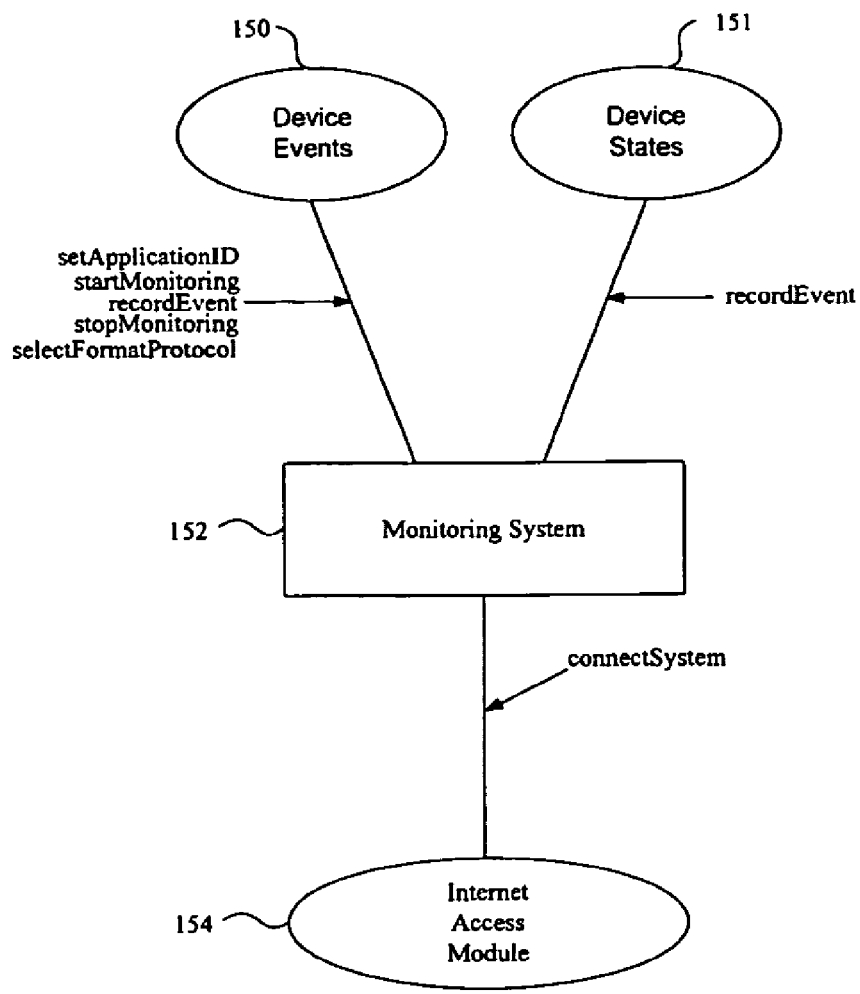
FIG. 5 shows the general architecture of the device according to the present invention.

FIG. 5 shows the general event management architecture of the device 20 that can be implemented as any one, or a combination of, a dynamic linked library, a script, a JAVA or C++ class, a C library routine, etc. The remainder of this discussion describes the implementation in terms of a DLL. The device 20 monitors events 150 and its state 151. The device 20 may obtain its state either periodically (e.g., every minute or every 5 minutes) or aperiodically (after five minutes, then after ten minutes, then after three minutes, etc.).

Further in FIG. 5, the Monitoring System 152 is the monitoring software or monitoring DLL that the device 20 uses to record and maintain the information it collects. The Monitoring System 152 provides five interface functions for use with the events 150 and one interface for use with the states 151. SetApplicationID allows the device to inform the Monitoring System 152 about the identification of the device 20. StartMonitoring allows the device 20 to inform the Monitoring System 152 that the monitoring system should prepare to log information. StartMonitoring lets the Monitoring System 152 initialize itself before recording information. RecordEvent allows the device 20 to inform the Monitoring System 152 that it should record the information. The device 20 will pass information to the Monitoring System 152 about its monitored events and states. The Monitoring System 152 may either maintain information about its latest event and/or state or maintain information about its events and/or states over a period of time. SelectFormatProtocol allows the device to inform the Monitoring System 152 which format and protocol to use to communicate the information to a desired party. StopMonitoring allows the device 20 to inform the Monitoring System 152 that it should stop recording information. In addition to triggering the Monitoring System 152 to communicate the information periodically, the Monitoring System 152 can be triggered to communicate the information to a desired party when the device 20 calls the interface function StopMonitoring.

FIGS. 4 and 5 show an Internet Access Module 154 that allows the Monitoring System 152 to communicate the state, event and even position information to the desired party. The Internet Access Module 154 provides the Monitoring System 152 wireless access to the Internet so that it may use simple mail transfer protocol (SMTP) or file transfer protocol (FTP) to communicate the information to the desired party such as the central service center. The Internet Access Module 154 provides the interface function ConnectSystem to the Monitoring System 152 to provide it access to the Internet.

The Monitoring System 152 contains information about the desired party to which the information is communicated. In one embodiment, this information is set up in the device 20 prior to beginning monitoring. This setup allows the device 20 to communicate the information to any desired party or recipient. Alternatively, the desired party can be identified after monitoring has begun.

Figure 6A:
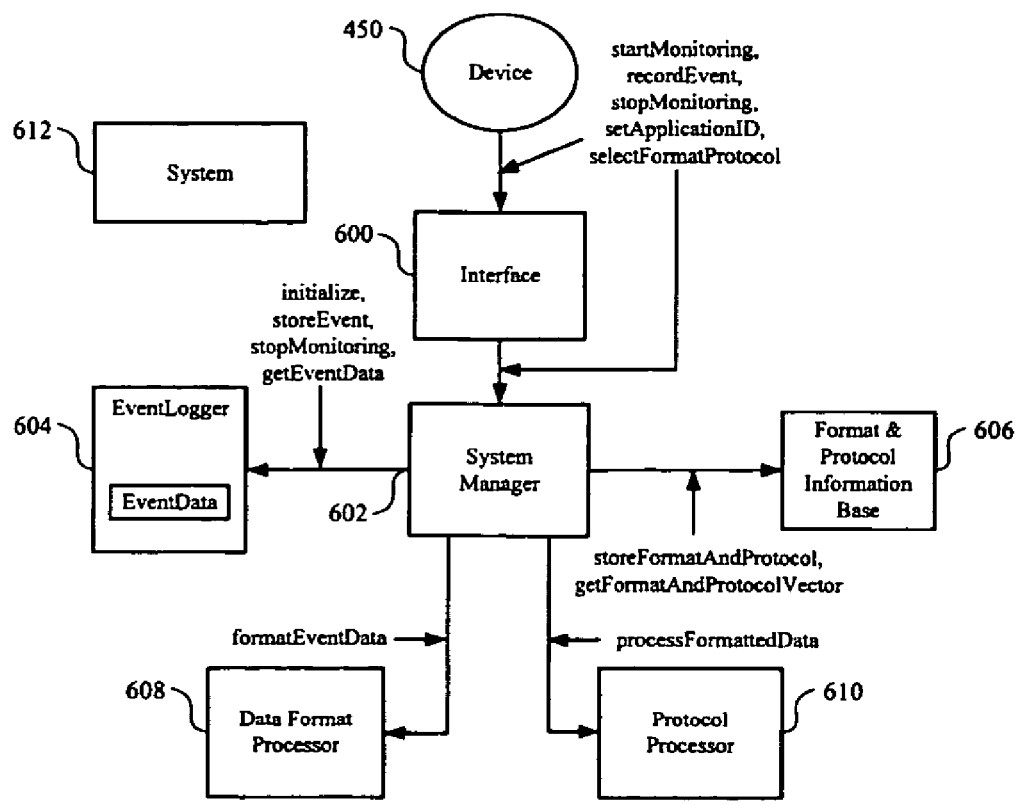
FIG. 6A shows the general architecture of the Monitoring System.

FIG. 6A shows the general event management architecture of the monitoring system that can be implemented as any one, or a combination of, a dynamic linked library (DLL), a static linked library, a script, a Java or C++ class, a C library or routine, etc. The remainder of this discussion describes the implementation in terms of a DLL. In general, an event/state receiver control application 450 communicates through an interface 600. The interface 600 specifies the API for the event management architecture (e.g., how information is passed via a C or C++ function call to the object(s) in the System manager 602 with the same names). The System Manager computer code device 602 manages the behavior of other computer code devices by using appropriate objects and their functions. Similarly, the Event Logger 604 records all the necessary information such as User ID, Application ID, Cumulative Session Number, Start Time, Duration and Sequence of Events with the elapsed times when requested through the system manager 602. The Event Logger 604 supports functions including: initialize( ), storeEvent( ), stopMonitoring( ), and getEventData( ).

The initialize function receives a string parameter for the Application ID. The System manager 602 calls this function when startMonitoring is called by the control application 450. The function sets the Application ID, takes care of the Cumulative number of uses, reads the clock to store the start time in order to compute the elapse time and duration, and sets up the user information by examining the registry.

After initialization, the storeEvent( ) function can be called with a string parameter for the Event passed by recordEvent. The EventLogger 604 stores the event string and the elapsed time from the start time (recorded during the initialize( ) function call).

After the application 450 has completed its usage monitoring, it calls the stopMonitoring function so that the duration can be computed. If multiple sessions are stored, this function stops the recording of a corresponding session.

The EventLogger 604 also provides access to a getEventData function. If the stopMonitoring was not previously called (i.e., the current session's duration field is undefined), the monitoring is stopped by calling the stopMonitoring function. The stopMonitoring function computes the duration of the current session. The getEventData function returns an abstract class with the access functions shown in FIG. 6B. The abstract class facilitates extensions for multiple sessions.

The Format And Protocol Information Base System 606 (implemented as any one or a combination of package, DLL, static library, etc.) stores the format and protocol information and checks the combination of formats and protocols to determine the valid combinations. To facilitate the storage process, the storeFormatAndProtocol function accepts two parameters (i.e., one for format and one for protocol). The function checks to ensure that the parameters are a valid combination.

The component 606 also includes a getFormatAndProtocolVector function returns a format and associated vector of protocols. In one embodiment, the function performs error checking. For example, if a protocol allows only one format to be sent, then the format should be the last format in the function call of selectFormatProtocol. The return value is a boolean value where true indicates that valid parameters were returned and false indicates that no more data is available. The return parameters are int and vector of int. The first int refers to the format while the vector of int refers to the vector of protocols for the format. When there is no selectFormatProtocol function call, the getFormatAndProtocolVector returns the default setting. Also would be evident, other collections (e.g., a list template) may be used in place of a vector.

The Data Format Processor 608 is responsible for formatting event data into a specified format. One exemplary function is the formatEventData function that receives a pointer to the abstract class EventData. The return value is a pointer to the abstract class FormattedEventData. Generally, interface to the FormattedEventData abstract class is defined as in FIG. 6C.

The Protocol Processor 610 is responsible for communicating the formatted event data through the specified protocol. In one embodiment, the processor 610 also encrypts the data before it is sent. To output the data, the processFormattedData function is called with an input pointer to the abstract class FormattedEventData. The function returns a boolean value where "true" represents no errors, and "false" represents the existence of an error while sending the formatted data.

The System 612 supplies important information and persistent information across the execution of the DLL. Some of the important information is timer information through the library call. The registry to keep the necessary information is another important component of the System 612. Many registry entries are set up at installation time. An exemplary structure for the registry is:

HKEY_LOCAL_MACHINE—SOFTWARE—RicohMonitor—XXX (ApplicationID)

Where XXX represents the Application ID, the following variables are placed in the registry under XXX tree: CumulativeUsage, UserID, SMTP Server, Recipients, From, FTP Server, FTP User, FTP Password, FTP Target Path etc. In one embodiment, CummulativeUsage is an integer, and the rest of the variables are strings.

Figure 7:
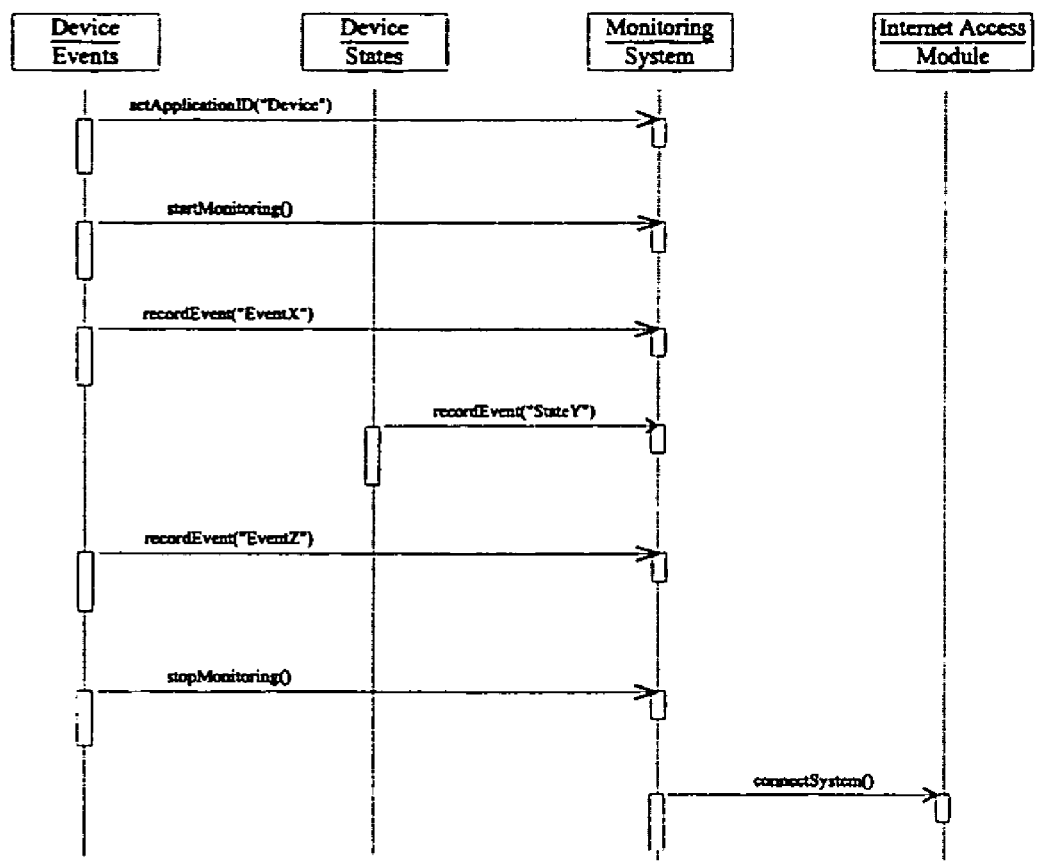
FIG. 7 shows the calling sequence of the interface functions within the device of the present invention.

FIG. 7 shows an exemplary calling sequence within the device 20. The device 20 sets the application ID through the interface function SetApplicationID of the Monitoring System. The device 20 starts the monitoring of the state and event information through the interface function StartMonitoring of the Monitoring System 152. The Monitoring System 152 records and maintains start information. The device 20 obtains state information periodically. For each occurrence, the device calls the interface function RecordEvent of the Monitoring System 152 passing the state information so that the Monitoring System 152 will keep track of the information. The Monitoring System 152 will periodically communicate the information by calling the interface function ConnectSystem of the Internet Access Module 154 to obtain access to the Internet. This will allow the Monitoring System 152 to communicate the information to a desired party. When the device 20 is to be turned off, the device stops monitoring the information by calling the interface function StopMonitoring of the Monitoring System 152. The Monitoring System 152 will communicate the final information by calling the interface function ConnectSystem of the Internet Access Module 154 to obtain access to the Internet and to communicate the information to a desired party.

Figure 8:
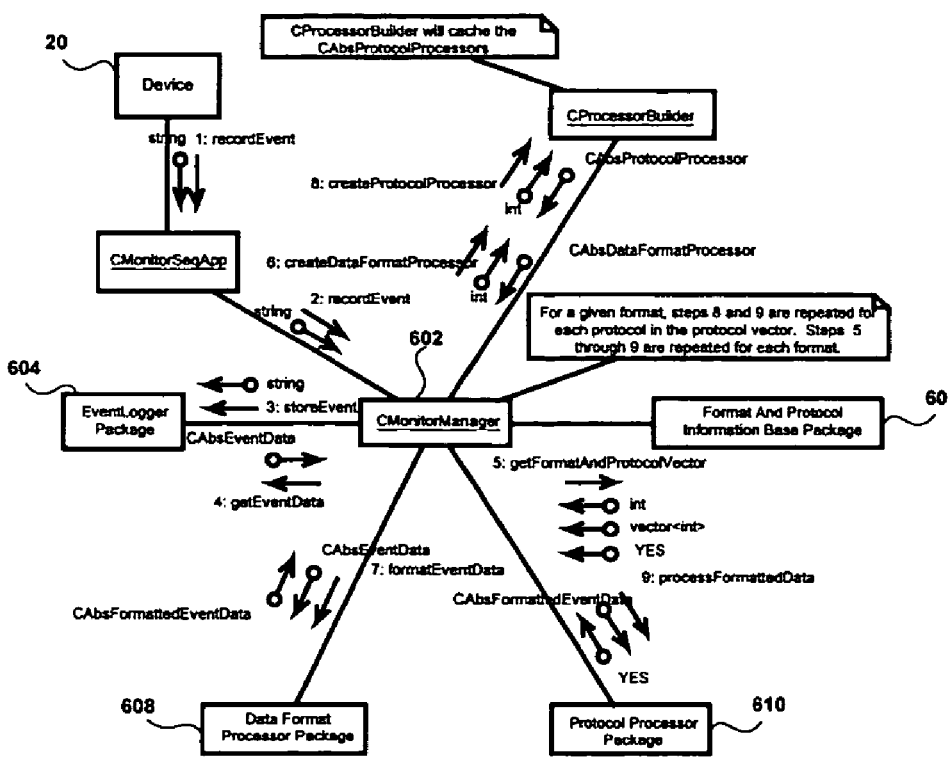
FIG. 8 shows the processing when the Monitoring System sends the monitored event and state information with the specified formats using the specified protocols.

FIG. 8 describes the process of sending the state and event information of the device. Steps 1 through 3 show the process of stopping the recording of state and event information. Step 4 shows the process of obtaining the information in order to communicate it to the Central Service Center. The class CMonitorManager contains trigger information about when to communicate the state and event information. Step 5 shows the process of obtaining the data format and communication protocol in which the information is communicated to the Central Service Center. Step 6 creates the data formatter for the selected formatting that is used to format the information in step 7. Step 8 obtains the protocol processor that is used to communicate the information in step 9. Steps 6 and 8 show that the formatters and protocol processors are created only when they are needed.

Figure 9:
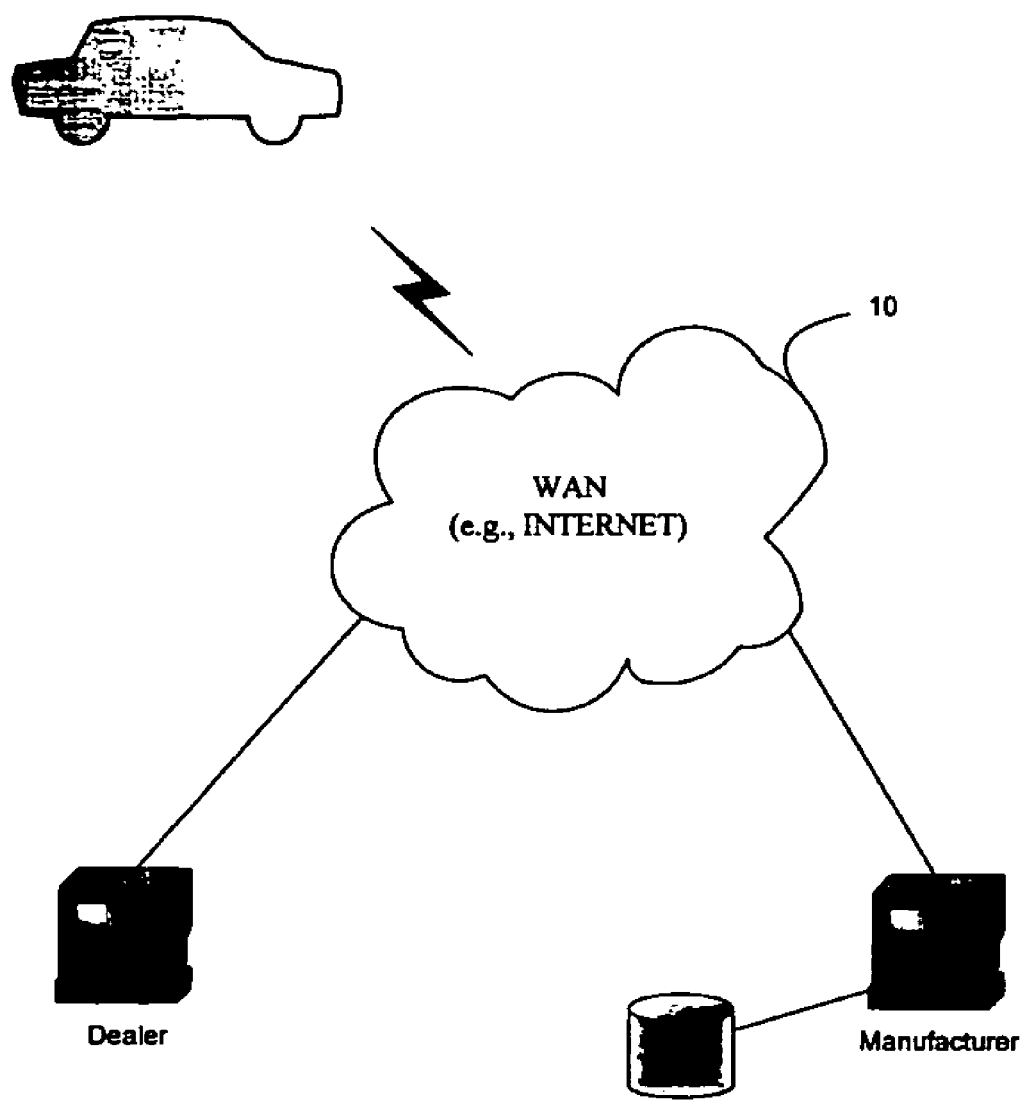
FIG. 9 shows an alternative calling sequence of the interface functions from the device according to the present invention.

FIG. 9 describes the use of the remote diagnostic and information collection and service system in which the device being monitored is a car. However, the system can be used to monitor any motor vehicle such as a motorcycle, recreational vehicle, bus, train, motorized boat, or airplane. The system consists of a car, the Internet, the manufacturer of the car, and the dealer that sold the car. The car provides state and event information to the Monitoring System of the car. The Monitoring System records and maintains the interaction between the car and the owner. The events that the Monitoring System may record are pressing on the gas pedal, turning on the air condition, and shifting the gear into drive. The Monitoring System also records and maintains the state of the car. The states that the Monitoring System may record are fuel level, mileage of the car, and radiator temperature.

When the car turns off or periodically, the Monitoring System will communicate the event and state information to the manufacturer of the car. The manufacture of the car can be considered the Central Service Center of this system. The Monitoring System will obtain wireless access to the Internet to communicate the information. The information is communicated to the manufacturer of the car through the Internet. The state and event information will be delivered to the workstation of the manufacturer. The information will be placed in the disk where historical information about the states and events of the car is stored.

The manufacturer will analyze the data it receives about the car. If the manufacturer discovers potential problems with the car, then the manufacturer will communicate the problem to the dealer who sold the car through the Internet. The car dealer is considered the Service Depot/Dealer of the system. The information about the problem with the car is delivered to the workstation of the dealer. The dealer can query information about the car from the workstation of the manufacturer through the Internet to obtain its service history. The dealer will then contact the owner of the car to correct the problem with the car.

The aforesaid methods and steps for remote monitoring are contained according to this invention on a computer program product. The computer program product is a storage medium including instructions which can be used to program or control a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 10:
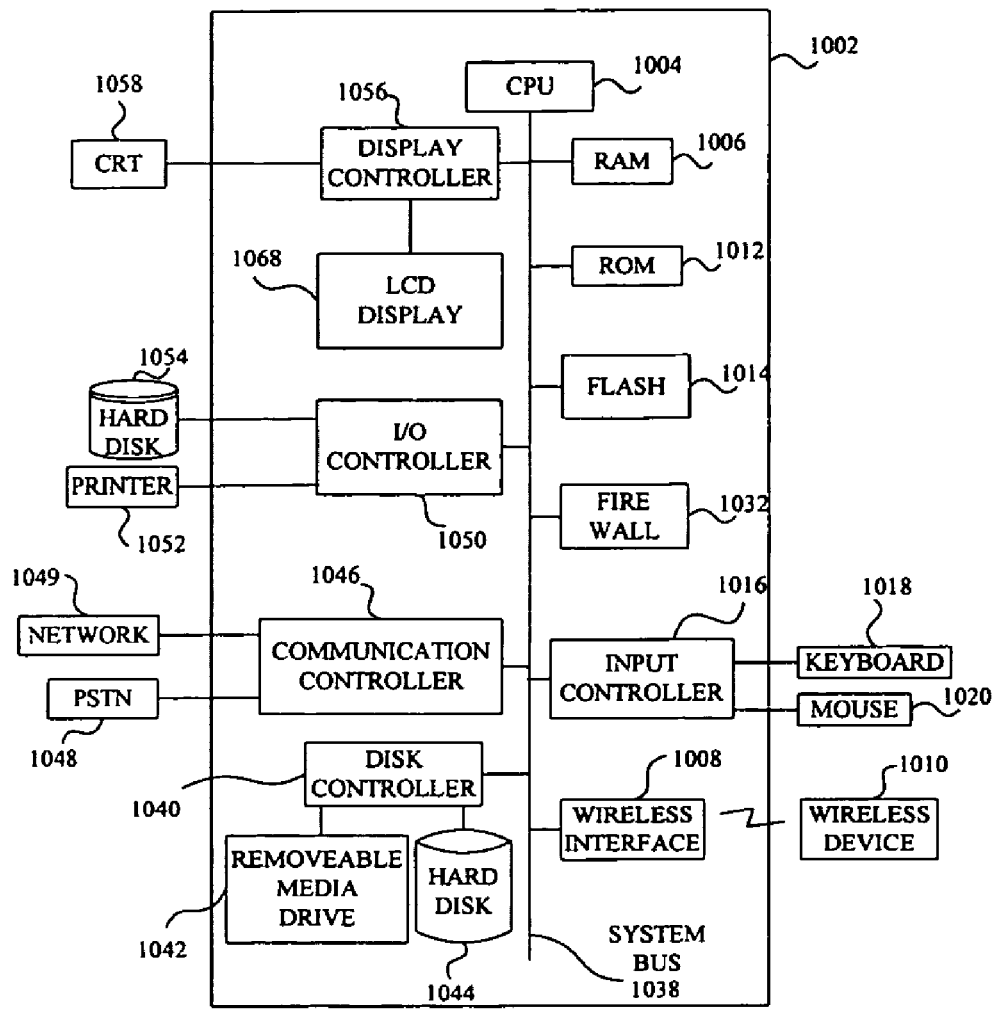
FIG. 10 illustrates the elements of an exemplary computer for use in an exemplary embodiment of the present invention.

The various computers utilized by the present invention, including the computers 42 and 56A-56D of FIGS. 2A-2C, may be implemented as illustrated in FIG. 10. Further, any other computer utilized by this invention may be implemented in a similar manner to the computer illustrated in FIG. 10, if desired. However, not every element illustrated in FIG. 10 is required in each of those computers. In FIG. 10, the computer 1002 includes a CPU 1004 which may be implemented as any type of processor including commercially available microprocessors from companies such as Intel, AMD, Motorola, Hitachi and NEC. There is a working memory such as a RAM 1006, and a wireless interface 1008 which communicates with a wireless device 1010. The communication between the interface 1008 and device 1010 may use any wireless medium (e.g., radio waves or light waves). The radio waves may be implemented using a spread spectrum technique such as Code Division Multiple Access (CDMA) communication or using a frequency hopping technique such as that disclosed in the above-mentioned BLUETOOTH specification.

There is a ROM 1012 and a flash memory 1014, although any other type of non-volatile memory (e.g., EPROM, or an EEPROM) may be utilized in addition to or in place of the flash memory 1014. An input controller 1016 has connected thereto a keyboard 1018 and a mouse 1020. There are serial and parallel interfaces (not shown) connected to serial and parallel devices (not shown). There is an IEEE 1394 device, commonly referred to as a fire wall device 1032, connected to an IEEE 1394 interface (not shown). The various elements of the computer 1002 are connected by a system bus 1038. A disk controller 1040 is connected to a floppy disk drive 1042 and a hard disk drive 1044. A communication controller 1046 allows the computer 1002 to communicate with other computers (e.g., by sending e-mail messages) over a telephone line 1048 or a network 1049. An I/O (Input/Output) controller 1050 is connected to a printer 1052 and a hard disk 1054, for example using a SCSI (Small Computer System Interface) bus. There is also a display controller 1056 connected to a CRT (Cathode Ray Tube) 1058, although any other type of display may be used including a liquid crystal display 1068, a light emitting diode display, a plasma display, etc.

The invention claimed is:

1. A system for monitoring a device, comprising:
   a monitoring unit located within the device and configured to obtain and store information of an event in the device which is an interaction between a user and the device, wherein the monitoring unit is configured to
   monitor the event as it occurs using sensors internal to the device;
   record ID information, a cumulative session identifier for the event, and a duration of the event corresponding to the cumulative session identifier;
   determine and store a sequence of use for a plurality of subcomponents of the device; and
   transmit the information of the event from the device, wherein the information of the event includes the sequence of use, the ID information, the cumulative session identifier, and the duration of the event;
   a receiver configured to receive the information of the event of the device transmitted by the monitoring unit;
   an analyzer configured to analyze the information of the event to identify a problem or abnormal condition of the device to determine a service request to be performed on the device; and
   a service depot comprising a computer configured to receive the service request from the analyzer over a Wide Area Network (WAN), to analyze the service request, and to contact a user of the device regarding the service request.

2. The system as claimed in claim 1, wherein the monitoring unit is configured to determine and store, in a memory, a cumulative number of uses of a subcomponent of the device that caused the event.

3. The system as claimed in claim 1, further comprising a transmitter configured to transmit a service history of the device to the service depot.

4. The system as claimed in claim 1, wherein the receiver comprises a configuration receiver configured to obtain system information from the device over a Wide Area Network.

5. The system as claimed in claim 1, wherein the device comprises a business office machine.

6. The system as claimed in claim 5, wherein the business office machine comprises at least one of a copier, a printer, a fax, a scanner, and a thin server.

7. The system as claimed in claim 1, wherein the device comprises a mobile unit.

8. The system as claimed in claim 7, wherein the mobile unit comprises at least one of an automobile, a boat, a train, and an airplane.

9. The system of claim 1, wherein the service depot is configured to transmit the service request to an owner of the device as an electronic mail message.

10. The system of claim 1, wherein the computer is configured to contact the user of the device through the WAN.

11. The system of claim 1, wherein the computer is configured to contact the user of the device by telephone or through an electronic mail message.

12. A computer program product, comprising: a computer storage medium and a computer program code mechanism embedded in the computer storage medium for causing a computer system to monitor a device, the computer program code mechanism comprising:
    a first computer code device configured to obtain and store information of an event in the device which is an interaction between a user and the device, wherein the first computer code device is configured to
    monitor the event as it occurs using sensors internal to the device;
    record ID information, a cumulative session identifier for the event, and a duration of the event corresponding to the cumulative session identifier;
    determine and store a sequence of use for a plurality of subcomponents of the device; and
    transmit the information of the event from the device, wherein the information of the event includes the sequence of use, the ID information, the cumulative session identifier, and the duration of the event;
    a second computer code device configured to receive the information of the event of the device transmitted by the first computer code device;
    a third computer code device configured to analyze the information of the event to identify a problem or abnormal condition of the device to determine a service request to be performed on the device; and
    a fourth computer code device configured to cause a service depot comprising a computer to receive the service request from the third computer code device over a Wide Area Network (WAN), to analyze the service request, and to contact a user of the device regarding the service request.

13. The computer program product as claimed in claim 12, wherein the first computer code is further configured to determine and store, in a memory, a cumulative number of uses of a subcomponent of the device that caused the event.

14. The computer program product as claimed in claim 12, further comprising:
    a fifth computer code device configured to transmit a service history of the device to the service depot.

15. The computer program product as claimed in claim 12, wherein the first computer code device comprises a fifth computer code device configured to obtain system information from the device over a Wide Area Network.

16. The computer program product as claimed in claim 12, wherein the device comprises a business office machine.

17. The computer program product as claimed in claim 16, wherein the business office machine comprises at least one of a copier, a printer, a fax, a scanner, and a thin server.

18. The computer program product as claimed in claim 12, wherein the device comprises a mobile unit.

19. The computer program product as claimed in claim 18, wherein the mobile unit comprises at least one of an automobile, a boat, a train and an airplane.

20. The computer program of claim 12, wherein the fourth computer code device is configured to transmit the service request to an owner of the device as an electronic mail message.

21. The computer program of claim 12, wherein the fourth computer code device is configured to contact the user of the device through the WAN.

22. The computer program of claim 12, wherein the fourth computer code device is configured to contact the user of the device by telephone or through an electronic mail message.

23. A computer-implemented method for monitoring a device, comprising:
    obtaining and storing, by a monitoring unit located within the device, information of an event in the device which is an interaction between a user and the device, wherein the obtaining step comprises
    monitoring the event as it occurs using sensors internal to the device;
    recording ID information, a cumulative session identifier for the event, and a duration of the event corresponding to the cumulative session identifier;

determining and storing a sequence of use for a plurality of subcomponents of the device; and transmitting the information of the event from the device, wherein the information of the event includes the sequence of use, the ID information, the cumulative session identifier, and the duration of the event;

receiving, by a receiver, the information of the event of the device transmitted by the monitoring unit;

analyzing, by an analyzer, the information of the event to identify a problem or abnormal condition of the device to determine a service request to be performed on the device;

receiving, by a service depot comprising a computer, the service request from the analyzer over a Wide Area Network (WAN);

analyzing, by the service depot, the service request; and contacting, by the service depot, a user of the device regarding the service request.

24. The computer-implemented method as claimed in claim 23, wherein the obtaining step comprises determining and storing a cumulative number of uses of a subcomponent of the device that caused the event.

25. The computer-implemented method as claimed in claim 23, further comprising:

transmitting a service history of the device to the service depot.

26. The computer-implemented method as claimed in claim 23, wherein the receiving step comprises:

obtaining system information from the device over a Wide Area Network.

27. The computer-implemented method as claimed in claim 23, wherein the device comprises a business office machine.

28. The computer-implemented method as claimed in claim 27, wherein the business office machine comprises at least one of a copier, a printer, a fax, a scanner, and a thin server.

29. The computer-implemented method as claimed in claim 23, wherein the device comprises a mobile unit.

30. The computer-implemented method as claimed in claim 29, wherein the mobile unit comprises at least one of an automobile, a boat, a train and an airplane.

31. The computer-implemented method of claim 23, wherein the transmitting step comprises:

transmitting the service request to an owner of the device as an electronic mail message.

32. The computer-implemented method of claim 23, wherein the contacting step comprises:

contacting the user of the device through the WAN.

33. The computer-implemented method of claim 23, wherein the contacting step comprises:

contacting the user of the device by telephone or through an electronic email message.

* * * * *